United States Patent
Swart et al.

(10) Patent No.: US 6,470,801 B1
(45) Date of Patent: Oct. 29, 2002

(54) CONFIGURATION FOR TRIGGERING A RESTRAINING DEVICE IN A MOTOR VEHICLE

(75) Inventors: Marten Swart, Obertraubling; Josef Dirmeyer, Bodenwöhr; Markus Wicke, Lappersdorf; Gerhard Kuhn, Köfering; Bruno Acklin, Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/242,769

(22) PCT Filed: Aug. 8, 1997

(86) PCT No.: PCT/DE97/01700
§ 371 (c)(1),
(2), (4) Date: Feb. 19, 1999

(87) PCT Pub. No.: WO98/07600
PCT Pub. Date: Feb. 26, 1998

(30) Foreign Application Priority Data

Aug. 19, 1996 (DE) .......................... 196 33 410
Aug. 19, 1996 (DE) .......................... 196 33 409

(51) Int. Cl.[7] .................................. F42C 19/00
(52) U.S. Cl. .................................. 102/201; 102/201
(58) Field of Search ........................ 102/201

(56) References Cited

U.S. PATENT DOCUMENTS

| | | | | |
|---|---|---|---|---|
| 3,554,129 A | * | 1/1971 | Alpers | 102/70.2 |
| 3,680,484 A | * | 8/1972 | Stetter | 102/87 |
| 4,059,822 A | | 11/1977 | Toshioka et al. | |
| 4,403,143 A | * | 9/1983 | Walker et al. | 250/227 |
| 4,529,875 A | * | 7/1985 | Brogardh et al. | 250/227 |
| 4,644,154 A | * | 2/1987 | Brogardh et al. | 250/227 |
| 4,862,802 A | * | 9/1989 | Streifer et al. | 102/201 |
| 4,917,014 A | * | 4/1990 | Loughry et al. | 102/201 |
| 4,917,914 A | | 4/1990 | Loughry et al. | |
| 5,007,661 A | * | 4/1991 | Lenzen | 280/735 |
| 5,036,767 A | | 8/1991 | Folsom et al. | |
| 5,404,820 A | * | 4/1995 | Hendrix | 102/201 |
| 5,460,407 A | * | 10/1995 | Stuckle | 280/741 |
| 5,572,016 A | * | 11/1996 | Wood et al. | 250/227.15 |
| 5,573,565 A | * | 11/1996 | Dalton et al. | 65/59.1 |
| 5,826,903 A | * | 10/1998 | Schiller et al. | 280/735 |

FOREIGN PATENT DOCUMENTS

| | | |
|---|---|---|
| DE | 4015045 A1 | 11/1990 |
| DE | 4224166 A1 | 2/1993 |
| DE | 4313571 C1 | 8/1994 |
| EP | 0289184 A1 | 11/1988 |
| EP | 0641689 A2 | 3/1995 |
| FR | 2641860 | 7/1980 |

* cited by examiner

Primary Examiner—Charles T. Jordan
Assistant Examiner—Lulit Semunegus
(74) Attorney, Agent, or Firm—Herbert L. Lerner; Laurence A. Greenberg; Werner H. Stemer

(57) ABSTRACT

A configuration for triggering a restraining device has firing elements that are optically fired by an associated triggering device. In addition, an optical check signal can be transmitted to the firing element by the triggering device. An evaluation circuit evaluates light signals that have been transmitted to the triggering device. As a function of an evaluated, received light signal, a disable signal, by which emission of a firing signal is prevented, is generated by the evaluation circuit.

33 Claims, 4 Drawing Sheets

CONFIGURATION FOR TRIGGERING A RESTRAINING DEVICE IN A MOTOR VEHICLE

CROSS-REFERENCE TO RELATED APPLICATION

This is a national phase of copending International Application PCT/DE97/01700, filed Aug. 8, 1997, which designated the United States.

BACKGROUND OF THE INVENTION

FIELD OF THE INVENTION

The invention relates to a configuration for triggering a restraining device in a motor vehicle.

Such a configuration fires the firing elements of the associated restraining device by light signals and is known from Published European Patent Application EP 0 641 689 A2. For this purpose, the known configuration has a triggering device that contains a control circuit for controlling a light source. An optical waveguide is used to transmit to the firing element an optical firing signal that is emitted by the light source. The monochrome firing signal has a sufficiently large amount of energy to optically fire the firing material contained in the firing element.

The known configuration does not have any functional monitoring whatsoever of the firing circuit that is composed of the optical waveguide and the firing element. If the firing circuit which is composed of the optical waveguide and firing element has an optical break, so that if, for example as a result of incorrect assembly or unsatisfactory repair, the firing element is no longer correctly plugged onto the optical waveguide or the optical waveguide has a severe bend or even a fracture, the high-energy optical light signal/laser signal generated as a result of a triggering request can emerge from the optical waveguide at the end of the optical waveguide or at the fracture without impedance. A vehicle occupant or a servicing or repair technician may be injured, in particular in the eyes, by such an emerging, high-energy light pulse, and at the same time a triggering request can be generated, for example, even when a vehicle is stationary in a workshop, as a result of a hammer blow against a sensor unit of the configuration. In addition, the vehicle may be set on fire. On the other hand, the restraining device can no longer be triggered satisfactorily in the event of an accident when the firing circuit is faulty.

German Patent DE 42 24 166 C2 discloses a configuration in which a triggering device is connected to a firing device via an optical waveguide. An optical firing signal which is transmitted to the firing device by the triggering device is converted by a converter in the firing device into an electrical signal by which an electric firing element of the firing device, usually a firing cap with a heating wire which is enclosed in the firing powder, is fired.

In such a configuration, numerous opto-electrical and electro-optical converters are necessary. In the case of a defect in the electrical part of the firing device, the optical waveguide can still be supplied with a high-energy optical firing signal, with the disadvantageous consequences described above.

SUMMARY OF THE INVENTION

It is accordingly an object of the invention to provide a configuration for triggering a restraining device in a motor vehicle that overcomes the above-mentioned disadvantages of the prior art devices of this general type, in which a maximum of safety can be achieved for the vehicle occupants despite a low level of expenditure on components.

With the foregoing and other objects in view there is provided, in accordance with the invention, a configuration for triggering a restraining device in a motor vehicle, including: a light source emitting an optical firing signal; a triggering device having a control circuit connected to and controlling the light source and initiating an optical check signal to be emitted by the light source; a firing element associated with a restraining device and outputting a light signal; an optical transmitter optically coupled to the firing element and to the light source for transmitting the optical firing signal emitted by the light source to the firing element; a light sensor optically coupled to the optical transmitter and receiving the light signal transmitted by the firing element; the triggering device having an evaluation circuit connected to the light sensor for evaluating the light signal received by the light sensor, the evaluation circuit generating a disable signal in dependence on an evaluation of the light signal for preventing an emission of the optical firing signal.

Here, in the first instance, an optical firing signal can be emitted, initiated by the control circuit, in order to fire the firing element. In the case of a firing process, the firing material in the firing element is caused to explode by the energy contained in the firing signal. As a result of which a housing of the firing element which holds the firing material is, if appropriate, blown apart at a predetermined fracture point and the energy which is released causes a gas generator which is disposed in the vicinity of the firing element to release gas. The gas that flows out fills, for example, a known airbags, but may also be used to pretension a seatbelt pretensioning device as restraining devices in a motor vehicle. The firing element is consequently fired directly by optical devices without the firing process being preceded by a conversion of the optical firing signal into an electrical signal. An optical transmitter, for example an optical waveguide, is used to transmit the optical firing signal from the triggering device to the firing element.

On the other hand, an optical check signal for functional checking of the firing circuit can be transmitted from the triggering device to the firing element. The triggering device in turn contains the evaluation circuit for evaluating the light signal that is transmitted to the triggering device via the optical transmitter, for example the above-mentioned optical waveguide, and is sensed by a photo-detector. In this way, light signals can be sensed and processed and, for example, transmitted back to the triggering device as a response to check signals that have been emitted. As a function of the evaluated, received light signal, the evaluation circuit generates a disable signal that subsequently prevents emission of the firing signal. Preferably, a warning device, which is for example optical or audible and which alerts the vehicle occupant to a malfunction in the vehicle occupant protection system, in particular in the firing circuit, is also activated as a function of the evaluated, received light signal. If appropriate, an entry in a programmable, nonvolatile memory takes place.

Consequently, by the configuration according to the invention it is possible to monitor the operational capability of the firing circuit composed of the optical transmitter and the firing element, on a permanent or cyclical basis or when the vehicle occupant protection system is put into service/ initialized, a firing signal being prevented from being emitted if a defect is discovered. The protection of vehicle occupants is significantly increased without additional expenditure in the form of a plurality of optical waveguides and/or converters being necessary.

Preferably, such a light signal which is sensed by the photo-detector of the triggering device is the check signal which is emitted and reflected at a reflection element. The reflection element is disposed here between the firing element end of the optical waveguide and a firing material of the firing element, the optical transmitter not necessarily being restricted to an optical waveguide in this or in other advantageous embodiments of the invention.

When the optical waveguide is functional and the firing element on the reflection element is correctly attached to the optical waveguide, the check signal is preferably completely reflected and transmitted back via the same optical waveguide to the triggering device where it is sensed by the photo-detector and evaluated by the evaluation circuit. The degree of transmission of the reflection element is dimensioned in all cases in such a way that a large part of the light intensity of the check signal is reflected and, if appropriate, only a small proportion of light is let through to the firing material. This small proportion of light that is let through must not under any circumstances cause the firing element to fire. On the other hand, the intensity of the check signal and the degree of reflection of the reflection element are dimensioned in all cases in such a way that the reflected check signal which is sensed by the photo-detector has a sufficient light intensity/signal level for processing, despite attenuation on the transmission path, and at the same time can be clearly distinguished from reflected check signals, which, however, have not been reflected at the reflection element of the firing element but rather, for example, at a fracture point of the optical waveguide. In the case of the latter, faulty optical waveguides, only a small proportion of the check signal is reflected and transmitted back to the triggering device. The proportion of the check signal which is reflected at such a bending point or fracture point of the optical waveguide is attenuated so heavily that it can be clearly distinguished from a check signal which is reflected at the reflection element of the firing element. The much greater proportion of the intensity of the check signal emerges from the optical waveguide at such a bending point or fracture point. In all cases, the check signal also has to be dimensioned in such a way that this proportion of the check signal that possibly emerges does not constitute a hazard for the vehicle occupants.

If the firing element is not mounted at the end of the optical waveguide, the check signal emerges at the end of the optical waveguide with virtually its entire light intensity. If appropriate, only a small proportion of the intensity is reflected on the front surface at the end of the optical waveguide and sensed by the triggering device as an extremely attenuated light signal. A disable signal is then preferably generated by the evaluation circuit if no light signal is sensed by the photo-detector or a light signal with an extremely low light intensity, at any rate below a prescribed threshold value, is sensed in response to the emission of a check signal, preferably within a defined, first time period after the emission of a check signal, as a result of which a faulty optical coupling between the optical waveguide and firing element is distinguished. For this purpose, the evaluation circuit has a compartor for comparing the received light signal with a threshold value.

In the configuration according to the invention, in which a reflection element is used for functional monitoring of the firing circuit, a disable signal is also preferably generated by the evaluation circuit if a light signal which is sensed by the photo-detector subsequent to the emission of the check signal, drops below a minimum light intensity, such as is the case when there is a break in the waveguide or a pronounced bend in the waveguide. This minimum light intensity is dimensioned so that it is greater than that light intensity which is received when the firing element is not plugged in, since the reflection point when the optical waveguide is broken lies closer to the triggering device, and the attenuation of the signal which is reflected at the fracture point is lower.

Preferably, a disable signal is generated if the first and/or the second previously mentioned criteria are fulfilled.

Accordingly, with these solution proposals according to the invention a line break, a bend in the line or an unsatisfactory optical coupling is reliably detected between the optical waveguide and the firing element.

If the optical waveguide has a strong bending point, or a line break, near to the triggering device, the check pulse which is reflected at this bend, or fracture point, can have an altogether high light intensity owing to the short line path and the thus low attenuation. Therefore, there is possibly a risk of the signal being confused with a check signal that has been reflected correctly at the reflection element of the firing element. If it is determined on these grounds that a light signal which has been sensed by the photo-detector is received by the evaluation circuit within a very brief, second time period after the emission of the check signal, a bending point or fracture point near to the triggering device is probable. In this case also, a disable signal is generated by the evaluation circuit. The second time period is made substantially shorter here than the first time period, since the check signal which is emitted is not allowed to pass through the entire optical waveguide and back again within the second time period. The first time period is, in contrast, dimensioned such that under normal circumstances a check signal which is emitted by the triggering device must have measured the distance from the triggering device to the firing element and back at the speed of light and with a sufficient time margin.

Alternatively or preferably additionally, the wavelength of the received light signal can be checked. If the wavelength of the received light signal differs from the wavelength of the emitted check signal, the disable signal is produced, since the received light signal makes it possible to conclude that extraneous light has been injected into the optical waveguide owing to a defective firing circuit.

Owing to the limited installation space of firing elements in a vehicle, for example in a steering wheel, it is advantageous to configure the reflection element as a thin reflective layer or as a reflective foil. Preferably, a thin aluminum foil is used. In a further advantageous development of the invention, the surface of the firing material of the firing element is used as a reflective layer. Here, the firing material contains, for example, graphite, which, in the first instance, has good optical firing properties owing to its ability to absorb light, and, in the second instance, if a surface is correspondingly polished, has good reflection properties.

A high-energy, optical firing signal that is transmitted from the trigger device to the firing element is preferably not reflected by the reflection element but rather let through to the firing material. The reflection element is configured here in such a way that, when a minimum quantity of supplied energy is exceeded it becomes at least largely translucent, preferably as a result of its destruction owing to the energy supplied with the firing signal. A thin aluminum foil has this property, for example. With graphite as the firing material, the polished surface of which is used as a reflection element, the degree of transmission changes to the detriment of the degree of reflection of the graphite surface as energy is increasingly supplied.

As an alternative to the reflection element, a light-generating element for the induced emission of the light signal may be disposed between the end of the optical waveguide and the firing material. Such a light-generating element follows essentially the functional principle of a laser: irradiation of the light-generating element with the photons of the check signal causes electrons of the light-generating element to be raised to a higher energy level. When the electrons drop back to their original energy level, photons of a defined wavelength are in turn emitted. These photons form a photoelectrically induced light signal that is transmitted to the triggering device via the optical waveguide. If the check signal is monochromatic like the induced light signal, or if it has at least a narrow wavelength range, in which case the wavelength ranges of the check signal and generated light signal differ, in the evaluation circuit of the triggering device it is possible to distinguish clearly, by reference to the wavelength, between a sensed light signal of the light-generating element and a check signal which has been reflected, for example, at a fracture point in the optical waveguide. Even if the optical coupling between the optical waveguide and firing element is faulty, the light signal which is received by the evaluation circuit never has the wavelength with which a light signal would be output by the light-generating element. The evaluation circuit then generates, in particular, a disable signal for preventing emission of the firing signal, if the light signal which is received by the receiver has a wavelength other than that which is defined for the light signal output by the light-generating element. Alternatively, or preferably additionally, the intensity of the received light signal can, of course, also be monitored. If the intensity drops below a minimum threshold value, the optical waveguide is then functional only under certain circumstances, as a result of severe bending for example. This results in a disable signal being output.

The intensity of the light signal that is induced by the check signal and is emitted by the light-generating element is dimensioned here in such a way that the firing material is not fired by the light signal which is output.

The light-generating element acts here as an optical pump and preferably contains gallium arsenide. The light-generating element may be integrated here as a semiconductor component, and thus require only a small installation space.

When it is supplied with sufficient energy, the light-generating element heats up to such an extent that the firing material is fired by the heating of the light-generating element.

Alternatively, a light-generating element for the induced emission of a light signal may be disposed between the end of the optical waveguide and the firing material, the light-generating element containing phosphorescent material. As a result of the optical excitation of the phosphorescent material by the actual optical check signal, a light signal is output by the light-generating element and is transmitted back to the triggering device via the optical transmitter, which, owing to the phosphorescent material in the light-generating element, lasts for a long time, in all cases in the microsecond range, preferably between 1 and 10 $\mu$s, and this process also continues to be detectable by the photo-detector for a long time, and can be evaluated by the evaluation circuit during this time. Furthermore, the light signal that is output by the light-generating element has a slowly decaying signal shape. The phosphorescent material continues to "light up" after its excitation, as is known from markings made of phosphorescent material on wrist watches or alarm clocks for example.

Thus, the evaluation circuit can be configured with lower power since, owing to the persistent, received light signal, more time is available for the evaluation. The selectivity between the check signal as excitor and the received light signal as response is significantly increased.

Preferably, when the light-generating element with phosphorescent effect is used, the light signal that is sensed by the triggering device is evaluated in terms of its intensity. If the intensity of the sensed light signal drops below a minimum threshold value, the disable signal is generated. Preferably, the signal shape of the sensed light signal is additionally evaluated. If the received light signal also has a decaying signal shape at an intensity above the minimum threshold value, it can be concluded that the firing circuit is functionally capable: the disable signal is not generated. With all the other evaluation results, the disable signal is generated. An extraneous light effect which indicates a defective firing circuit and which usually has a non-decaying signal shape is thus detected. Alternatively or additionally, the wavelength of the received light signal can be evaluated. Since phosphorescent material outputs light with a narrow wavelength range, a disable signal can also be generated if the wavelength of the received light signal differs from the wavelength of the light which is output by the phosphorescent element. If this evaluation is output in addition to the evaluation of the intensity and the signal shape of the received light signal, the functional capability/faultiness of the firing circuit can be determined very precisely.

Preferably, a time framework for the received light signals is also set when the phosphorescent element is used. As in the case of the other, alternative solutions presented, the received light signal is to be brought about by the emission of the check signal. For this reason, a maximum time frame, a first time period, within which received light signals are used for the evaluation is set, starting from the emission of a check signal. When the phosphorescent element is being used, it is possible, in addition, to set a time after the emission of a check signal, starting from which time light signals are allowed for the evaluation, in order, if appropriate, to exclude partial reflections of the check signal from the evaluation and to allow for the emission of light signals by the phosphorescent element being delayed by a short delay time.

Owing to the relatively long time interval between the emission of the check signal and the reception of the light signal of the phosphorescent element, the light source and the photo-detector are configured, in one advantageous development of the invention, as a single optical component which converts electrical pulses into optical check pulses, for example, and which, on the other hand, converts light pulses into electrical pulses. A laser, for example, is such an optical component.

As an alternative to the configuration of a reflection element, of a laser or of a phosphorescent element between the optical waveguide and the firing material, the absence of the optical coupling between the optical waveguide and the firing element or a line break can also be detected solely by a specially configured evaluation circuit. Here, the time period between the emitted check signal and received light signal is evaluated in the evaluation circuit.

With reference to the measurement of the propagation time, it is possible, for example, to determine the location of a line break: the shorter the propagation time between the emitted check signal and the received check signal, the closer the fracture point or bending point is to the evaluation circuit. When the firing element is not plugged on, at least a small part of the check signal is reflected at the end of the optical waveguide. Thus, even an insufficient optical coupling between the optical waveguide and lighting element can be detected and distinguished from other operating states. During the actual evaluation of the propagation time, the intensity of a check signal which is reflected at the end of the optical waveguide when the firing element is plugged on differs significantly in all cases from the intensity of a check signal which is reflected at the end of the optical waveguide when the firing element is not plugged on, since the refractive index between the optical waveguide (glass, plastic) and air differs from the refractive index between the optical waveguide and the firing material. When the firing element is fitted on, a much greater proportion of the check signal is absorbed by the firing material than when the firing element is not plugged on. However, the check signal must not cause the firing element to fire.

The disable signal is correspondingly generated by the evaluation circuit. The disable signal is preferably, as is also the case in the other solutions according to the invention, generated as a function of the light intensity of the light signal which is received by the triggering device.

Moreover, insufficient optical coupling between the optical waveguide and the triggering device can also be detected in all the solutions according to the invention.

A further solution of the problem according to the invention consists in disposing a second optical waveguide(s) between the triggering device and the firing element. Here, the check signal and firing signal are generated by the control circuit with the light source and are fed into the first optical waveguide. The photo-detector is disposed at the end of the second optical waveguide at the triggering device end. At the firing element end, that is to say between the ends of the optical waveguides on the one hand and the firing material on the other, a coupling element is disposed which introduces into the second optical waveguide a check signal which has arrived from the first optical waveguide. The coupling element is to be considered here to be a reflective layer which does not reflect light signals into the same optical waveguide from which the light signals are received, but rather into the second optical waveguide. Thus, the properties that were previously attributed to the reflection element apply to the coupling element. For example, the optical waveguides are disposed with respect to the reflection plane of the reflection element in such a way that the angle of incidence and angle of reflection are identical.

The configuration according to the invention has the advantage that the evaluation circuit has an extremely simple construction: if the optical coupling between the firing element and the optical waveguides is insufficient or if the optical waveguide path is interrupted, the photo-detector can either receive only an extremely small light signal when there is severe bending of the optical waveguide or cannot receive any light signal when there is a break in the line or the firing element is not plugged on. The detection of a line break or of a firing element which is not plugged on may possibly be sufficient for a distinguishing circuit in the evaluation circuit for distinguishing between light-intensive and less light-intensive, received light signals to be dispensed with. Preferably, the evaluation circuit has a time window which is equivalent to the first time period known from the first development of the configuration (keyword: reflection element), so that the disable signal is generated by the evaluation circuit if no light signal is sensed by the photo-detector within this first time period after the emission of a check signal.

A further solution according to the invention consists in also disposing two optical waveguides between the evaluation device and the firing element, the light source being assigned to the two optical waveguides. The photo-detector is also assigned to the two optical waveguides. In the evaluation circuit, propagation times of check signals that are emitted on the two optical waveguides are evaluated and compared with one another. If the propagation times that are determined do not correspond, it is possible to generate disable signals which prevent emission of firing signals on the two optical waveguides. Alternatively, it is possible to generate a disable signal that prevents emission of the firing signal on the optical waveguide whose associated firing circuit is classified as having a defect.

The faulty firing circuit is determined by evaluating the light signals sensed in response to emitted check signals, preferably in comparison with the measurement results relating to the further firing circuit.

This configuration can also additionally either have a reflection element or a light-generating element between the end of each optical waveguide and the firing element that is connected to the triggering device via the two optical waveguides.

Other features which are considered as characteristic for the invention are set forth in the appended claims.

Although the invention is illustrated and described herein as embodied in a configuration for triggering a restraining device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a configuration 1 according to the invention with a voltage source $U_{Bat}$, a voltage regulator 18, that supplies a supply voltage $U_{Sup}$, a firing capacitor 17, an acceleration sensor 15, a sensor evaluator 151, two control circuits 11, two evaluation circuits 13, two light sensors such as photo-detectors 14, two light sources 12 and four controllable switching stages 19.

Figure 1:
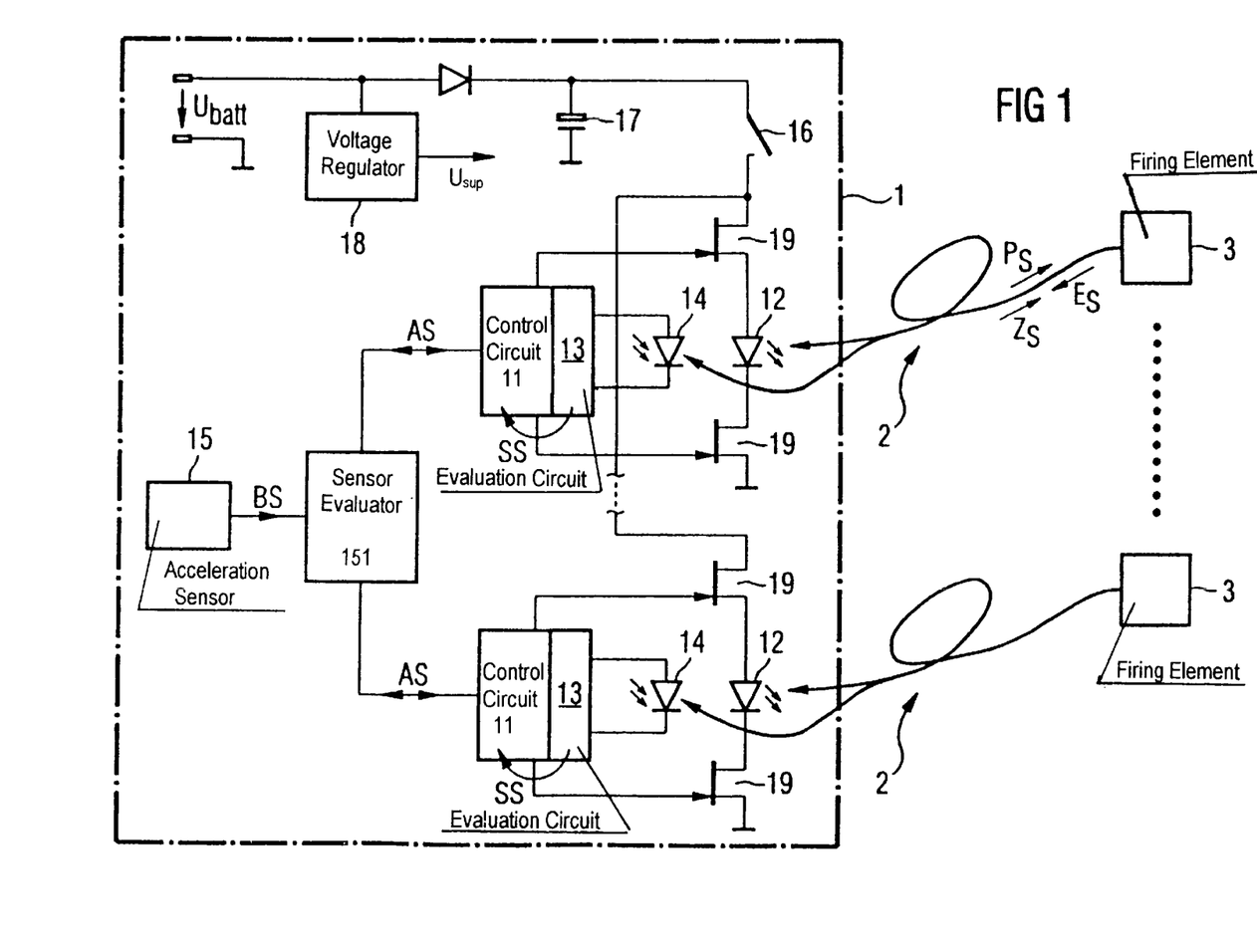
FIG. 1 is a diagrammatic, block circuit diagram of a configuration according to the invention.

The supply voltage $U_{Sup}$ that is necessary for a triggering device is derived from the voltage source $U_{Bat}$ using the voltage regulator 18. In addition, the firing capacitor 17 is charged via the voltage source $U_{Bat}$ and is used as a reserve energy source for triggering firing elements 3 that are actuated by the triggering device. The voltage source $U_{Bat}$ and the firing capacitor 17 are connected, via a safing sensor 16, which is configured for example as an acceleration switch, to triggering circuits that each have two controllable switching stages 19 and a light source 12 between the controllable switching stages 19. The individual triggering circuits are disposed parallel to one another. The control circuit 11 serves to actuate, in each case, two associated, controllable switching stages 19 of the triggering circuit. Each triggering circuit is also assigned the photo-detector 14 that is connected to the evaluation circuit 13.

Vehicle accelerations are sensed by the acceleration sensor 15 and are supplied, as acceleration signals BS, to the sensor evaluator 151 and evaluated there. If one or more, possibly selected restraining devices of the configuration 1 are triggered in order to protect the vehicle occupants on the basis of the evaluation of the supplied acceleration signals BS, the sensor evaluator 151 transmits a corresponding triggering signal AS to the respective control circuit 11. The control circuit 11 causes the associated switching stages 19 to connect through, as a result of which a current flows through the light source 12, causing a high-energy optical firing signal ZS to be emitted.

Each light source 12 is optically coupled, via an optical waveguide 2, to a firing element 3 of the associated restraining device. The firing signal ZS is supplied to the firing element 3, so that a firing material 32 of the firing element 3 is optically fired and as a result the restraining device is triggered. In addition, an optical check signal PS that is triggered by the control circuit 11 is transmitted to the firing element 3 via the light source 12. Light signals ES, which are transmitted to the triggering device, are sensed by the photo-detector 14 for each triggering circuit and are evaluated in the associated evaluation circuit 13. As a function of the received light signals ES, control signals SS are generated, and they in turn influence their own, associated control circuit 11, control circuits 11 which are assigned to other triggering circuits or else the sensor evaluator 151 in terms of their mode of operation.

The light sources 12 are preferably configured as laser sources, in particular as laser diodes. The photo-detectors 14 are preferably configured as phototransistors or photodiodes. In particular, laser sources, which can generate firing signals ZS with sufficient energy for firing a firing element 3, are advantageous for emitting firing signals ZS. Any desired light emitting diodes, which also generate non-monochromatic light, may be used to emit check signals PS that may be of low-energy. Preferably, an infrared light emitting diode is used to emit the check signals, while a laser diode is used to emit the firing signal.

Figure 7:
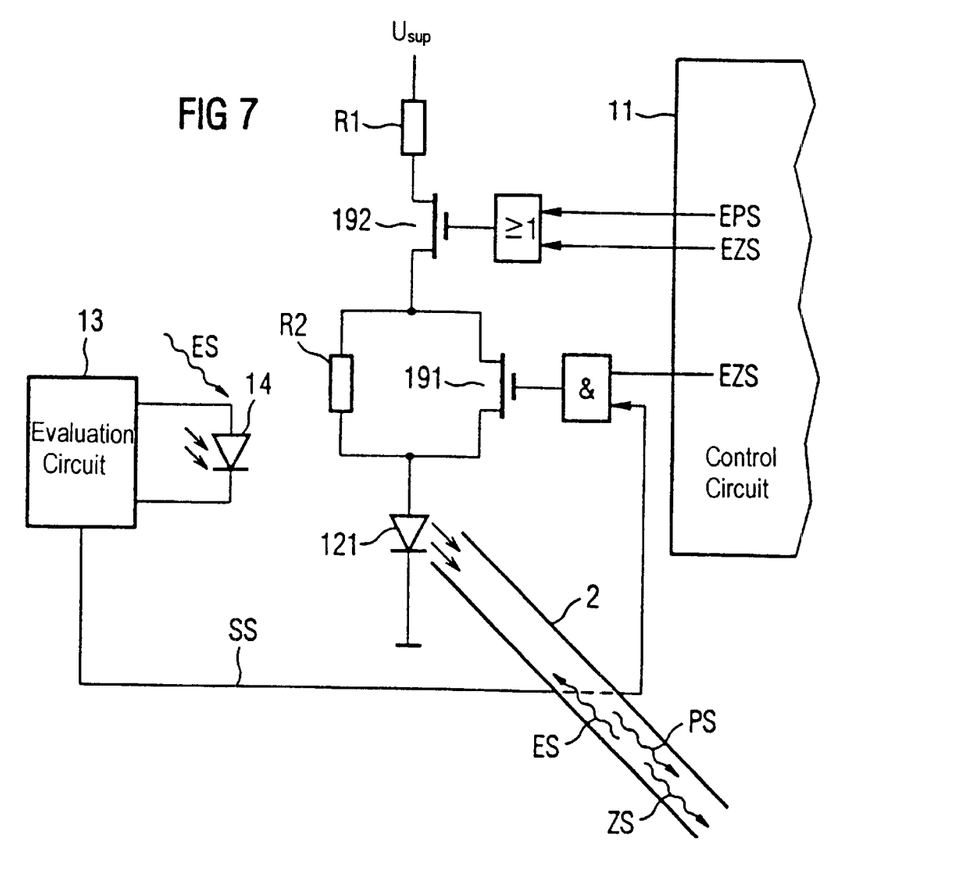
FIG. 7 is a circuit diagram of a triggering device.

FIG. 7 shows an exemplary circuit configuration of a detail of the triggering device which has a laser diode 121 for emitting both the firing signal ZS and the check signal PS. Here, the laser diode 121 is, in the first instance, connected to earth and, in the second instance, connected in series with a resistor R2 and a controllable switch 191 and in series with a further, controllable switch 192, a resistor R1 and a supply voltage $U_{Sup}$. The control input of the first, controllable switch 191 is connected to an AND gate & to whose inputs an electrical firing signal EZS is applied by the control circuit 11, and the disable signal SS supplied by the evaluation circuit 13. The control input of the further, controllable switch 192 is connected to an OR gate >1 to whose inputs the electrical firing signal EZS and the electrical check signal EPS of the control circuit 11 are applied.

The laser diode 121 is optically connected to the optical waveguide 2. If an optical firing signal ZS is output by the triggering device, the control circuit 11 designates, for example, the electrical firing signal EZS as a "1" and the disable signal SS of the evaluation circuit has a "1" when the firing circuit is not faulty. In this way, the controllable switches 191 and 192 are connected through so that the resistor R2 is short-circuited and a high current flows through the light source 12. This results in a high-energy, optical firing signal ZS on the optical waveguide 2.

If an optical check signal PS is output via the optical waveguide 2, the control circuit 11 designates the electrical firing signal EZS as a "0" and the electrical check signal EPS, in contrast, as a "1" so that the controllable switch 192 is connected through. Given the previous designation of the disable signal as a "1" the controllable switch 191 is nonconductive so that voltage drops across the resistor R2 and a low current thus flows through the light source 12, which results in a low-energy optical firing signal PS on the optical waveguide 2. If, for example, as a result of the optical light signal ES which has been received via the optical waveguide 2 a fault is detected in the firing circuit 2, 3 by the evaluation circuit 13, the evaluation circuit 13 designates the disable signal SS as a "0" so that an optical firing signal ZS is prevented from being output in all cases even if the control circuit 11 designates the electrical firing signal as a "1".

The control circuit 11, the evaluation circuit 13 and the sensor evaluator 151 are preferably integrated together as a microprocessor.

Figure 2:
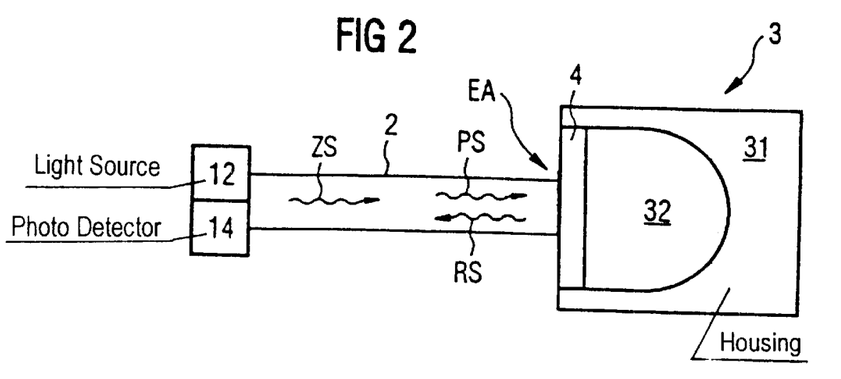
FIGS. 2 to 6 are block circuit diargrams of a coupling between one or more optical waveguides of the configuration and a firing element.
Figure 3:
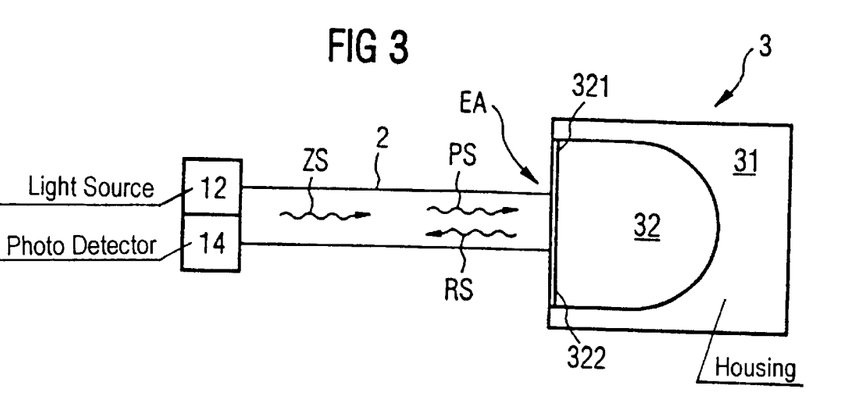

FIGS. 2 to 5 show the connection of the firing element 3 to at least one optical waveguide 2. In this context, the firing element 3 usually has a housing 31 that contains a chamber that is filled with the firing material 32. In FIG. 2, a reflection element 4 is disposed between the end EA of the optical waveguide 2 and the firing material 32. Check signals PS are reflected at the reflection element 4 and transmitted back to the triggering device as reflection signals RS. Firing signals ZS destroy the reflective layer 4, so that the energy contained in the firing signals ZS is transported into the firing material 32. Alternatively, high-energy firing signals ZS change the transmission properties of the reflection element 4 to the effect that high-energy signals are let through to the firing material 32. In FIG. 3, the surface 321 of the firing material 32 which faces the front end of the optical waveguide 2 serves as a reflective layer. The optical waveguide 2 is connected to the firing material 32 via a connecting foil 322 that does not influence the optical transmission. This connecting foil 322 serves merely to prevent the firing material 32, which is possibly present in powdered form, from escaping from the housing 31 of the firing element 3. For the rest, various other kinds of optical elements may be disposed between the optical waveguide 2 and firing material 32, such as for example lenses for focusing the firing signal onto a fixed point in the firing material 32.

Figure 4:
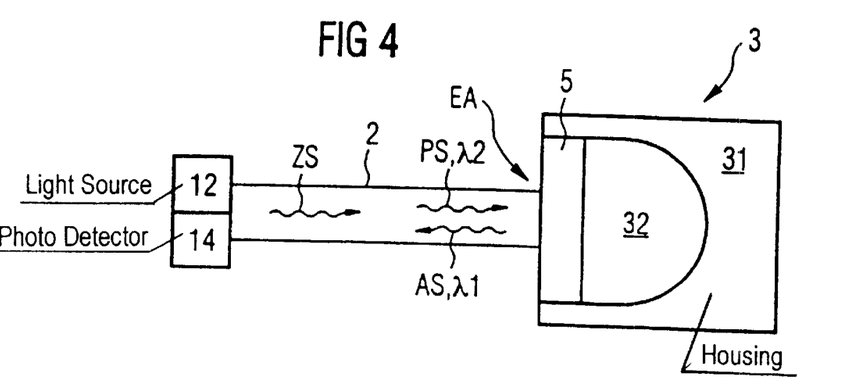

FIG. 4 shows the solution according to the invention with a light-generating element 5. The check signal PS which arrives at the light-generating element 5 with a wavelength $\lambda 2$ causes a light signal AS which is generated by the light-generating element 5 and has a wavelength $\lambda 1$, which differs from the wavelength $\lambda 2$, to be transmitted back. The statements relating to FIGS. 2 and 3 apply to the firing signal ZS.

Figure 5:
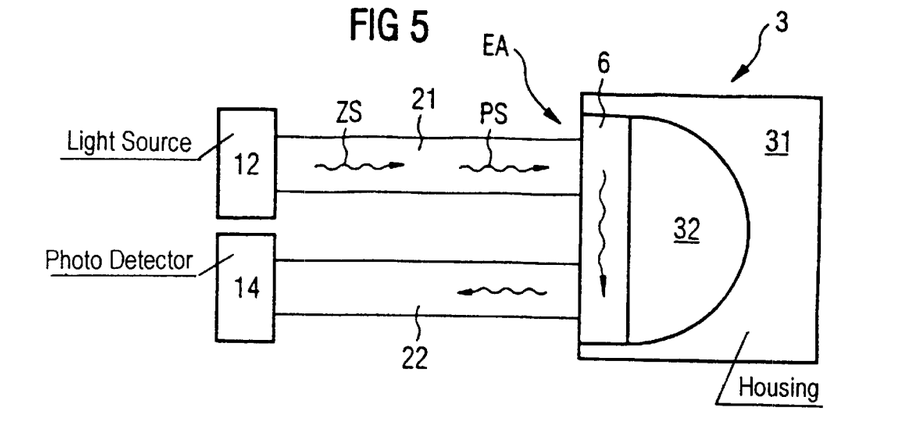

In FIG. 5, two optical waveguides 21 and 22 are connected to the firing element 3. Here, the firing element 3 has a coupling element 6 that deflects the check signal PS, which arrives via the first optical waveguide 21, onto the second optical waveguide 22. In this case, the coupling element 6 can be considered to be a specially constructed reflective layer.

Figure 6:
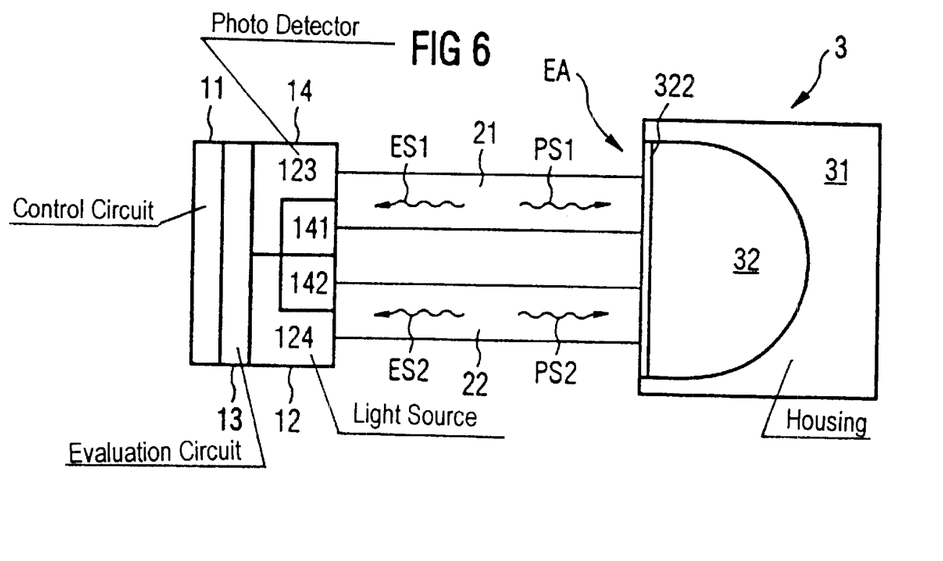

FIG. 6 illustrates the solution according to the invention with two optical waveguides where differences in propagation times of check signals PS1, PS2 on the optical waveguides 21 and 22 are evaluated. The optical waveguides 21 and 22 may be fed in here at the triggering device end by the light source 12 which preferably has in each case one photo-transmitter 123, 124 for each optical waveguide 21, 22. Each photo-transmitter 123, 124 can then be activated independently of the other photo-transmitter 124, 123. In the case of configurations which have just one light source 12 with a single photo-transmitter for both optical waveguides 21, 22, firing and check signals ZS, PS can only be output simultaneously on both optical waveguides 21, 22. If a fault is detected in the firing circuit and firing signals that are to be emitted are subsequently disabled, it is no longer possible to select a firing circuit. As a rule, the photo-detector 14 has in each case one phototransistor 141, 142, or the like, per optical waveguide 21, 22.

The configuration according to the invention is not restricted to one or two firing elements. The firing elements may be actuated here by point-to-point connections in accordance with FIG. 1, in each case one light source communicating with one firing element via an optical waveguide. However, the invention is not restricted to this type of communication. If desired, one light source may also be provided for a plurality of firing elements, in which case individual, selected firing elements can be actuated by active or passive optical multiplexers solely via a single light source.

In applications in which the wavelength of the received light signal is evaluated, the photo-detector preferably also acts as a filter for these wavelengths (ranges). Here, for example, a phototransistor which is used can have a corresponding, spectral characteristic curve, or a spectral filter is connected upstream of the phototransistor.

Preferably, the light source, the photo-detector and the controllable switching stage that actuates the light source are disposed together on an integrated chip.

The term light or optical signal in the present application includes also light outside the visible spectrum of light, for example infrared radiation and other wavelength ranges. Thus, for example, a laser diode used as light source generates light signals of approximately 800 nm.

We claim:

1. A configuration for triggering a restraining device in a motor vehicle, comprising:
   a light source emitting an optical firing signal;
   a triggering device having a control circuit connected to and controlling said light source and initiating an optical check signal to be emitted by said light source;
   a firing element associated with a restraining device;
   an optical transmitter optically coupled to said firing element and to said light source for transmitting said optical firing signal emitted by said light source to said firing element;
   a light sensor optically coupled to said optical transmitter and receiving a light signal transmitted in answer to said optical check signal;
   said triggering device having an evaluation circuit connected to said light sensor for evaluating said light signal received by said light sensor, said evaluation circuit generating a disable signal in dependence on an evaluation of said light signal for preventing an emission of said optical firing signal.

2. The configuration according to claim 1, wherein said optical transmitter is an optical waveguide.

3. The configuration according to claim 1, wherein said light source is a laser source.

4. The configuration according to claim 1, wherein said light source has a laser source for emitting said optical firing signal and a light transmitter differing from said laser source for emitting said optical check signal.

5. The configuration according to claim 1, wherein said optical firing signal has a first light intensity and said optical check signal has a second light intensity lower than said first light intensity.

6. The configuration according to claim 1, wherein said evaluation circuit has a comparator for comparing said light signal with a threshold value.

7. The configuration according to claim 2, wherein:
   said firing element has a firing material;
   said optical waveguide has a firing element end; and
   including a reflection element disposed between said firing element end of said optical waveguide and said firing material of said firing element for reflecting said optical check signal.

8. The configuration according to claim 7, wherein said reflection element becomes at least largely translucent when a minimum quantity of supplied energy is exceeded.

9. The configuration according to claim 7, including an attachment element, said firing element is a unit that is structurally separated from said optical waveguide and is optically coupled to said optical waveguide via said attachment element, and said reflection element is associated with said firing element.

10. The configuration according to claim 7, wherein said reflection element is one of a thin reflective layer and a reflective foil.

11. The configuration according to claim 7, wherein said reflective element is an aluminum foil.

12. The configuration according to claim 7, wherein said firing material has a surface that forms said reflective element.

13. The configuration according to claim 12, wherein said firing material contains graphite.

14. The configuration according to claim 2, wherein:
   said firing element has a firing material;
   said optical waveguide has a firing element end; and
   including a light-generating element disposed between said firing element end of said optical waveguide and said firing material of said firing element, said light-generating element receiving said optical check signal and said optical check signal causing an excited emission forming said light signal with a defined wavelength from said light-generating element.

15. The configuration according to claim 14, wherein said optical check signal emitted by said light source has a wavelength that is different from said defined wavelength of said light signal emitted by said light-generating element.

16. The configuration according to claim 14, wherein said light-generating element contains gallium arsenide.

17. The configuration according to claim 14, including an attachment element, and said firing element is a unit structurally separated from said optical waveguide and optically coupled to said optical waveguide via said attachment element, and said light-generating element is associated with said firing element.

18. The configuration according to claim 14, wherein said disable signal is generated by said evaluation circuit if said defined wavelength of said light signal received by said light sensor differs from a prescribed wavelength.

19. The configuration according to claim 18, wherein said prescribed wavelength corresponds to said defined wavelength of said light signal that is output by said light-generating element.

20. The configuration according to claim 1, wherein said optical transmitter has a first optical waveguide optically coupled to said light source and a second optical waveguide optically coupled to said light sensor, and including an optical coupling element disposed on said firing element and optically coupled to and between said first optical waveguide and said second optical waveguide by which light emerging from said first optical waveguide is introduced into said second optical waveguide.

21. The configuration according to claim 1, wherein said optical transmitter has optical waveguides including a first optical waveguide and a second optical waveguide optically coupled to said light source and said light sensor, said evaluation circuit evaluating light signals transmitted to said evaluation circuit via said optical waveguides.

22. The configuration according to claim 21, wherein said light source and said light sensor each have a photo-detector, said disable signal generated by said evaluation circuit if, after an emission of optical check signals on said optical waveguides said light signal is sensed by one of said light sensor and said light source.

23. The configuration according to claim 2, wherein:
   said firing element has a firing material;
   said optical waveguide has a firing element end; and
   including a light-generating element containing a phosphorescent material disposed between said firing element end of said optical waveguide and said firing material of said firing element.

24. The configuration according to claim 23, wherein said light source and said light sensor are a single optical component.

25. The configuration according to claim 1, wherein said evaluation circuit, only takes into account light signals received by said light sensor within a defined first time period after an emission of said optical check signal, for generating said disable signal.

26. The configuration according to claim 1, wherein said disable signal is generated by said evaluation circuit if said light signal is sensed by said light sensor after an emission of said optical check signal.

27. The configuration according to claim 1, wherein said disable signal is generated by said evaluation circuit in dependence on a light intensity of said light signal received by said light sensor.

28. The configuration according to claim 1, wherein a time period between an emission of said optical check signal and a reception of said light signal is evaluated in said evaluation circuit.

29. The configuration according to claim 28, wherein said disable signal is generated by said evaluation circuit in dependence on a time of said time period.

30. The configuration according to claim 1, wherein said disable signal is generated by said evaluation circuit if said light signal is received by said light sensor within a defined time period after an emission of said optical check signal.

31. The configuration according to claim 1, wherein said light sensor is a photo-detector with a spectral filter for a prescribed wavelength.

32. The configuration according to claim 23, wherein a signal profile of said light signal received by said light sensor is evaluated in said evaluation circuit.

33. The configuration according to claim 23, including an attachment element, said firing element is a unit structurally separated from said optical waveguide and optically coupled to said optical waveguide via said attachment element, and said light-generating element contains light-generating and phosphorescent material and is associated with said firing element.

* * * * *